United States Patent Office 2,906,761
Patented Sept. 29, 1959

2,906,761

ARGENTIFEROUS GERMICIDAL MEDIUM AND PROCESS FOR MAKING SAME

Meyer Mendelsohn, New York, N.Y., assignor to Ions Exchange & Chemical Corp., New York, N.Y., a corporation of New York No Drawing. Application January 30, 1956
Serial No. 561,997

7 Claims. (Cl. 260—430)

This invention relates to germicidal and antiseptic compositions and more particularly to novel solutions and powders comprising complexes of modified kojic acid.

An object of the present invention is to provide a novel composition containing kojic acid modified by an oxidant.

The present invention more specifically concerns a medium containing the reaction product of silver with modified kojic acid, usable as germicidal agents in soaps, cosmetics, shampoos, deodorants and many medicinal preparations for topical application.

It has been found that kojic acid can be reacted in aqueous acidic solution with a mild oxidant such as hydrogen peroxide, and the reaction product thereof will then dissolve silver oxide or powdered silver to form a solution having highly bactericidal and germicidal properties.

It has further been found that a solution of improved germicidal properties may be obtained by admixing the modified kojic acid solution with a solution of a uronic acid, such as partially depolymerized alginic acid, in the silver reaction process herein.

The reaction product of kojic acid and hydrogen peroxide in aqueous acid solution is referred to herein as "modified kojic acid." It is believed to be an oxidized form of kojic acid, but the precise structure of the reaction product in aqueous solution has not been determined.

It is a principal object of the invention to provide a germicidal composition containing a heavy metal or heavy-metal oxide and modified kojic acid.

It is a further object to provide a germicidal solution containing a substantial quantity of silver, modified kojic acid, and a partially depolymerized polymeric uronic acid.

The invention is directed to the above mentioned germicidal, antiseptic and anti-bacterial media as well as to methods of preparation thereof, and to products containing such media.

Kojic acid has heretofore been known to have some bactericidal properties. Use of kojic acid as a bactericide in contact with the human body has been impractical however because of its acidity and its weak bactericidal activity. Various metal salts of kojic acid are also known to have some bactericidal properties. These substances have also proven impractical for use in soaps, cosmetics, and medicinal preparations because of their insolubility, color, low bactericidal activity and irritating effect on the human skin. In the present invention the objectional features of kojic acid and metal salts of kojic acid have been overcome by increases in solubility and bactericidal activity, and reductions in acidity and skin irritation effects. Furthermore the invention provides colorless or substantially colorless liquid products which may be readily incorporated into soaps, creams, and liquid cosmetic and medicinal preparations for local or topical application.

Following are examples setting forth procedures for preparing solutions or liquid media according to the invention.

PROCEDURE 1

5 grams of 35% aqueous hydrogen peroxide $H_2O_2$ are added to 100 grams of aqueous 3% kojic acid solution. The solution is stirred at room temperature for about 48 hours. The resultant liquid is "modified kojic acid"; and generally has a pH of about 3 at this stage. Powdered metallic silver in the amount of 3 grams or an equivalent amount (i.e. 4 grams) of silver oxide $Ag_2O$ is added to the modified kojic acid solution and stirred for about 48 hours at room temperature. The pH of the resultant liquor is thereupon preferably adjusted to about 5–6 before filtration, though this step is not essential. The resulting mixture is filtered to obtain the clear colorless solution, containing about 0.3% silver. The filtration residue contains metallic silver which may be reused in this process.

The clear colorless solution obtained by the above procedure is non-irritating on contact with the skin of the human body and has both bactericidal and fungicidal properties. The solution is stable and does not darken on standing. It will not precipitate out soaps, creams, lotions, shampoos and cosmetics provided that the pH is maintained at less than 10. If the pH of the base material containing the solution exceeds 8 some darkening on standing may occur.

It has been found that the germicidal and fungicidal characteristics may be increased by increasing the quantity of metal in the solution as will be described in Procedure 2. If higher mixing temperatures and more concentrated peroxide solutions are used in the above procedure a more rapid dissolution of silver into the solution is obtained but in lesser amounts owing probably, to an at least partial decomposition of the kojic acid into oxalic acid.

PROCEDURE 2

10 grams of 35% aqueous hydrogen peroxide $H_2O_2$ are added to 200 grams of aqueous 3% kojic acid solution. The solution is mixed at room temperature (20°–30° C.) for about 48 hours to obtain modified-kojic-acid solution. Alginic acid in the form of a white powder is partially depolymerized by heating for at least 6 days at 80° C. 10 grams of the resulting yellowish powder is dissolved in 200 cc. of water. This 5% solution of partially depolymerized alginic acid is mixed with 200 cc. of the modified-kojic-acid solution. This resulting solution has its pH adjusted to 4.5 by adding potassium hydroxide (KOH) thereto. 5 grams of powdered silver or silver oxide are added to the adjusted solution and mixed therewith for 48 hours at room temperature. The resulting mixture is filtered. The clear filtrate contains about 1% by weight of silver. It has a pH of about 7.5 and is of a distinctly amber color. This solution is more germicidal than the solution obtained by Procedure 1. The solution is non-irritating to the human skin and may be used in lotions, cosmetics, soaps, shampoos and medicinal preparations for topical applications. The solution is stable and will not darken on standing. The residue of the filtering step above contains silver which may be reused in repeating the process.

If desired, other non-toxic uronic acids and their derivatives may be used instead of alginic acid. In particular, partially depolymerized pectinic acid, pectin alkylene glycol alginates, mannuronic and glucoronic acids may be used. It is desirable to effect a preliminary partial depolymerization of the alginic acid to reduce the viscosity of the resulting product and increase the quantity of oligodynamic metal in the final product.

The germicidal product of Procedure 1 has the very desirable property of being a clear colorless solution so that it can be used as an ingredient of clear liquid lotions and astringents, without discoloring the white or clear carrier of the germicidal product.

The germicidal products of both Procedures 1 and 2 can be used in soaps, shampoos, cosmetics, and medicinal preparations for topical application where the slightly amber color of the germicidal product will not be objectionable.

It is believed that the high bactericidal potency of the silver-modified kojic-acid solution produced by Procedure 1 is attributable in part to the metal content of the solution. The higher bactericidal potency of the silver-modified kojic-acid/alginic-acid solution of Procedure 2 is believed attributable to the greater concentration of silver in the solution. The silver in these solutions is believed bound in a complex with the modified kojic acid.

The addition of 1% to 5% by weight of the germicidal medium to carriers such as shampoos, creams, lotions, astringents, hair tonics, soaps, salves, and other preparations for external applications will generally produce sufficient bacterial potency therein. If the carrier initially has some germicidal properties, the addition of the germicidal medium will increase its bactericidal potency. The measure of sufficient bactericidal potency is taken as that potency of the finished product which produces a 2- to-3-mm. zone of inhibition by the test therefor described below.

In many hair tonics, creams, lotions, salves and other preparations above mentioned for external application, the carriers, such as wool fat, natural oils, such as olive oil, petrolatum, Irish moss, etc., may become rancid, odorous and/or irritating to the human skin because of the action of bacteria thereon. This invention has particular usefulness for the prevention of such bacterial action. According to this invention, incorporation of the product of Procedure 1 or 2 into such preparation in an amount sufficient to provide a finished product of such desired potency above described as "sufficient bactericidal potency" utilizes the germicidal characteristics of the medium to act as a preservative for the components which would otherwise be attacked by bacteria. Such addition prevents the deterioration of the carrier. Such addition also provides desirable germicidal characteristics to the finished product.

The product of Procedure 1 and the product of Procedure 2 may be further treated by addition of acetone thereto. On treatment of the aqueous product of Procedure 1 by addition of about 20–25 cc. of that product to a beaker containing about 100 cc. of acetone, with vigorous stirring of the contents of the beaker to prevent coagulation, a powder of white to light yellow color results. When filtered and dried the powder has a silver content of about 10% by weight. This powder readily dissolves in water: the thus-formed aqueous solution has the bactericidal, physical and chemical properties of the product of Procedure 1. This powder will also dissolve in ethyl alcohol. This powder has no odor of formic acid, propionic acid or oxalic acid. Treatment of about 20–25 cc. of the aqueous product of Procedure 2 by the addition thereof to a beaker containing about 100 cc. of acetone, while vigorously stirring the contents of the beaker to prevent coagulation, produces a brown powder of about 20–25% by weight of silver.

The powder thus obtained from the product of Procedure 2 redissolves in water; the solution thus formed has the physical, chemical and bactericidal properties exhibited by the liquid product of Procedure 2. The liquid products of Procedures 1 and 2 may also be treated by vacuum evaporation to produce powders as above described.

The products of Procedures 1 and 2 in liquid form may be added to hair tonics, lotions, salves, creams and other preparations above mentioned of liquid and gel form by admixture of the solution obtained by Procedure 1 and/or 2 with the preparation in sufficient quantity to obtain the desired bactericidal activity in the finished product, i.e. usually between 1% and 5% by weight of product of Procedures 1 and 2. The admixture is performed while vigorously agitating the mixture as needed to obtain a homogeneous product. The aforementioned addition of the product of Procedure 1 is of particular utility where a colorless additive is desired. The product of Procedure 2 is used where an amber-colored product is permissible. The powders obtained by treating the product of Procedure 1 or 2 with acetone or by evaporation may be admixed with solids, such as face powders and dusting powders, or with liquid and paste-like preparations, such as salves and creams, by conventional mixing and dissolving techniques and apparatuses.

The alginic acid used in Procedure 2 is a polymer of a uronic acid; other polymers of uronic acids may be used in the procedure if desired.

In the table below are shown the results of tests for bactericidal activity of aqueous solutions of the products obtained by Procedures 1 and 2, respectively. These products are compared with kojic acid in aqueous solution. The bactericidal activity of the aqueous products of Procedures 1 and 2 and of aqueous solutions of kojic acid were tested against Gram-positive and Gram-negative strains of bacteria. The aqueous products obtained by Procedures 1 and 2 were each diluted and tested at 100%, 50% and 5% of their original concentrations as produced. The aqueous solution of kojic acid tested was a 3% aqueous solution thereof. This solution was tested at its original strength, i.e. at 100% of its original concentration, and was also diluted and tested at concentrations corresponding to 50%, 10% and 5% of its original concentration.

The 3% concentration of kojic-acid solution was tested since such a solution has the maximum acidity the human skin can tolerate without marked irritation. The control material was distilled water.

The bactericidal activity of the various products were tested by zone-of-inhibition tests such as described in Proceedings of the Society of Experimental Biology and Medicine, vol. 55, No. 3, March 1944. The test organisms, either *Micrococcus pyogenes*, var. *aureus* (#209) or *Salmonella typhosa* (Hopkins), were transferred from an agar slant twice through peptone broth (1% peptone, 0.5% NaCl) for 24-hour growth periods at 37% C. The second transfer was held at 5° C. for 16 to 18 hours. Ten cc. fresh nutrient tryptone glucose extract agar was pipetted into uniform flat-bottomed Petri dishes of 4 inches diameter and incubated for 16–18 hours at 37° C. These plates were held under refrigeration for at least one hour.

One ml. of each refrigerated culture was incorporated into each agar plate. The plates were then dried for one hour at 37° C. using racks which supported the top half of a Petri dish above the bottom half so that there was about one-half of an inch clearance. The plates were stored under refrigeration, inverted, at least one hour.

Filter-paper discs one-half inch in diameter were sterilized by dry heat and immersed in the test fluid until saturated (30 seconds). They were then removed from the fluid with sterile forceps and, after gently shaking off the excess, were placed on the seeded plates. Special care was taken to set the discs in place without smearing the surface of the agar. Four filter papers, evenly spaced, were placed in each plate. For greater accuracy plates were run in triplicate. One of the discs on each plate was the control. The plates were incubated, not inverted, at 37° C. for 20 hours, while placed on blocks to avoid excess condensation.

The zones of inhibition were observed with a diffuse light. The zones of inhibition were measured, and the average value of the triplicate observations were recorded and appear in the table below.

Table of diameters of zones of inhibition (millimeters)

|  | Micrococcus aureus (Gram positive) | | | | Salmonella typhosa (Gram negative) | | | |
|---|---|---|---|---|---|---|---|---|
| Percent of product in test solution | Percent 100 | Percent 50 | Percent 10 | Percent 5 | Percent 100 | Percent 50 | Percent 10 | Percent 5 |
| Product of Procedure 1 | 23 | 20 | 12 | 10 | 23 | 18 | 12 | 10 |
| Product of Procedure 2 | 29 | 25 | 19 | 16 | 29 | 29 | 23 | 19 |
| Kojic Acid | 6 | 0 | 0 | 0 | 3 | 0 | 0 | 0 |
| Control | 0 | 0 | 0 | 0 | 0 | 0 | 0 | 0 |

The results of the tests as indicated in the table show that the product of Procedure 2 has maximum bactericidal potency at all aqueous dilutions. The product of Procedure 1 also has a very high bactericidal potency. The kojic-acid solution has only limited bactericidal potency at maximum concentration and exhibited no bactericidal potency when diluted to 50% or less in aqueous solution.

Kojic acid is also known as 2-hydroxymethyl-5-hydroxy-gamma-pyrone and has an empirical formula $C_6H_6O_4$. Its structural formula is believed to be:

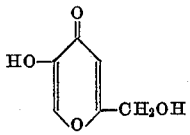

By the use of the term "modified kojic acid" in the specification and claims reference to the reaction product of kojic acid with an oxidant is intended. It is to be understood that equivalent ways of preparing such "modified kojic acid" may be practiced by those skilled in the art aside from the specific example set forth herein above.

In Procedures 1 and 2 "modified kojic acid" is prepared with hydrogen peroxide ($H_2O_2$) as the oxidant, effective over a substantial period of reaction time. Hydrogen peroxide is the preferred agent because at the termination of the reaction it is no longer physically present, as such, in the resultant "modified kojic acid" solution.

Basically then, the present invention resides in the reaction of kojic acid with an oxidant which modifies the kojic acid, to a form which has been discovered to react with silver in its metallic powder form, or as silver oxide, silver peroxide, or equivalent silver forms.

Procedure 2 basically differs from Procedure 1 in resulting in an end product with a higher concentration of silver. Such latter result is due to the addition of a polymer of a uronic acid such as partially depolymerized alginic or pectinic acid to the modified-kojic-acid solution before the reaction of that solution with silver.

The end product of the invention resulting from Procedures 1 and 2 are aqueous solutions. The precipitation process and resulting solid or powder product thereof are also within the scope of the present invention. Such resulting products containing "modified kojic acid," reacted with silver, exercise significant germicidal and bactericidal activity, and are specifically useful with products suitable for topical and equivalent applications.

What is claimed is:

1. A process for producing an antibacterial composition, comprising the steps of oxidizing kojic acid in aqueous acid solution and reacting the oxidation product with a substance selected from the group consisting of silver and substantially water-insoluble silver compounds.

2. A process according to claim 1, comprising the further step of adding a partially depolymerized polyuronic acid to said solution before reacting said oxidation product with said substance.

3. A process according to claim 1 wherein said kojic acid is oxidized by reacting it with approximately half its own weight of hydrogen peroxide, the silver being substantially equal in weight to said kojic acid.

4. A process according to claim 3 wherein said polyuronic acid is alginic acid.

5. A process according to claim 4 wherein said kojic acid is oxidized by reacting it with approximately half its own weight of hydrogen peroxide, the proportion of the partially depolarized alginic acid being approximately 1½ times of that of said kojic acid, the silver being substantially equal in weight to said kojic acid.

6. A germicidal composition comprising the reaction product of oxidized kojic acid with a substance selected from the group consisting of silver and substantially water-insoluble silver compounds.

7. A germicidal composition comprising the reaction product of a substance selected from the group consisting of silver and substantially water-insoluble silver compounds with a mixture consisting of partially depolymerized alginic acid and oxidized kojic acid.

References Cited in the file of this patent

FOREIGN PATENTS

| 431,656 | Great Britain | July 12, 1935 |
| 476,376 | Great Britain | Dec. 2, 1937 |

OTHER REFERENCES

Chem. Abs., vol. 18, 1924, pp. 1665, 1666.

Obata et al.: "Flavors of Soy Sauce . . .," J. Agr. Chem. Soc., Japan, vol. 24, 1951, pp. 334–338 (thru Chem. Abstr., 1952, pp. 11474, 11475).

Okac et al.: "Analytical Evaluation of Kojic Acid," Chem. Listy, vol. 48, 1954, pp. 828–838 (thru Chem. Abstr., 1954, pp. 13538–13539).

Yabuta et al.: "Constitution of Kojic Acid," J. Agr. Soc. Japan, vol. 6, 1930, pp. 516–525 (thru Chem. Abstr., vol. 26, 1932, pp. 1931–1932).